United States Patent
Kim et al.

(10) Patent No.: US 8,781,215 B2
(45) Date of Patent: Jul. 15, 2014

(54) IMAGE PROCESSING APPARATUS AND CONTROL METHOD THEREOF

(75) Inventors: Chang-won Kim, Gwangju-si (KR); Ki-deok Lee, Seoul (KR); Hwa-seok Seong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 13/207,037

(22) Filed: Aug. 10, 2011

(65) Prior Publication Data

US 2012/0201449 A1 Aug. 9, 2012

(30) Foreign Application Priority Data

Feb. 7, 2011 (KR) ........................ 10-2011-0010612

(51) Int. Cl.
*G06K 9/00* (2006.01)
(52) U.S. Cl.
USPC ......................................... 382/154
(58) Field of Classification Search
USPC ......... 382/154, 107, 159, 181, 190, 199, 209, 382/236; 345/419–420
See application file for complete search history.

(56) References Cited

U.S. PATENT DOCUMENTS

| 7,876,953 | B2 * | 1/2011 | Ryu et al. ...................... 382/154 |
| 2008/0112616 | A1 | 5/2008 | Koo et al. |
| 2010/0080485 | A1 | 4/2010 | Chen et al. |
| 2010/0119149 | A1 | 5/2010 | Hong et al. |
| 2010/0128034 | A1 | 5/2010 | Han et al. |
| 2011/0243443 | A1* | 10/2011 | Varekamp ..................... 382/173 |

FOREIGN PATENT DOCUMENTS

| EP | 2268045 A1 | 12/2010 |
| JP | 2007-264722 A | 10/2007 |
| JP | 2009-053748 A | 3/2009 |
| KR | 10-2010-0059013 A | 6/2010 |
| WO | 2005060271 A1 | 6/2005 |
| WO | 2009139740 A1 | 11/2009 |

OTHER PUBLICATIONS

Communication dated May 3, 2012 issued by the European Patent Office in counterpart European Application No. 11175390.1.

* cited by examiner

*Primary Examiner* — Daniel Mariam
(74) *Attorney, Agent, or Firm* — Sughrue Mion, PLLC (57) ABSTRACT

An image processing apparatus and a control method thereof are provided. The an image processing apparatus includes: a depth map estimating unit which estimates a depth map of a stereoscopic image; a region setup unit which sets up a region in the stereoscopic image; and a 3D effect adjusting unit which determines a difference in a depth level between the setup region and a surrounding region other than the setup region based on the estimated depth map, and adjusts a 3D effect of the stereoscopic image based on the determined difference in the depth level.

34 Claims, 6 Drawing Sheets

IMAGE PROCESSING APPARATUS AND CONTROL METHOD THEREOF

CROSS-REFERENCE TO RELATED APPLICATION

This application claims priority from Korean Patent Application No. 10-2011-0010612, filed on Feb. 7, 2011 in the Korean Intellectual Property Office, the disclosure of which is incorporated herein by reference.

BACKGROUND

1. Field

Apparatuses and methods consistent with exemplary embodiments relate to an image processing apparatus and a control method thereof, and more particularly, to an image processing apparatus capable of adjusting a 3D effect of a stereoscopic image and a control method thereof.

2. Description of the Related Art

Recently, technology for displaying a stereoscopic image for making a viewer feel a 3D effect based on binocular parallax caused by distantness between the viewer's eyes has attracted attention.

Related art technology for displaying the stereoscopic image is concentrated on adjusting only a depth level of the stereoscopic image in order to enhance the 3D effect.

However, to provide a viewer with the enhanced 3D effect, not only the depth level but also the quality of the stereoscopic image has to be improved.

SUMMARY

One or more exemplary embodiments provide an image processing apparatus capable of improving not only depth but also picture quality of a stereoscopic image in order to enhance a 3D effect of the stereoscopic image, and a control method thereof.

According to an aspect of an exemplary embodiment, there is provided an image processing apparatus including: a depth map estimating unit which estimates a depth map of a stereoscopic image; a region setup unit which sets up a region in the stereoscopic image; and a 3D effect adjusting unit which determines a difference in a depth level between the setup region and a surrounding region other than the setup region on the basis of the estimated depth map, and adjusts a 3D effect of the stereoscopic image in accordance with the determined difference in the depth level.

The 3D effect adjusting unit may adjust a depth of the stereoscopic image in accordance with whether the determined difference in the depth level exceeds a first level.

The 3D effect adjusting unit may adjust the depth of the stereoscopic image to increase the difference in the depth level if the determined difference in the depth level does not exceed the first level.

The 3D effect adjusting unit may determine whether the difference in the depth exceeds a second level if the determined difference in the depth exceeds the first level, and adjust the depth of the stereoscopic image to decrease the difference in the depth level if the difference in the depth level exceeds the second level.

The 3D effect adjusting unit may adjust the 3D effect of the stereoscopic image in accordance with whether the depth level of the setup region exceeds the third level.

The 3D effect adjusting unit may adjust the depth of the setup region to increase the depth level of the setup region if the depth level of the setup region does not exceed the third level.

According to an aspect of another exemplary embodiment, there is provided an image processing apparatus including: a depth map estimating unit which estimates a depth map of a stereoscopic image; a region setup unit which sets up a region in the stereoscopic image; and a picture quality adjusting unit which determines difference in a depth level between the setup region and a surrounding region other than the setup region on the basis of the estimated depth map, and adjusts pixel information of the stereoscopic image in accordance with the determined difference in the depth level.

The picture quality adjusting unit may adjust the pixel information of the stereoscopic image in accordance with whether the difference in the depth level exceeds a first level.

The picture quality adjusting unit may adjust the pixel information of the stereoscopic image by adjusting at least one of detail, contrast, color and brightness of the stereoscopic image.

The picture quality adjusting unit may adjust the pixel information of the stereoscopic image so that at least one of a detail level, a contrast level, a color level and a brightness level of the setup and surrounding regions can be increased if the determined difference in the depth level does not exceed the first level, and at least one of the detail level, the contrast level, the color level and the brightness level of the setup region can be more increased than that of the surrounding region.

The picture quality adjusting unit may determine whether the difference in the depth level exceeds a second level if the determined difference in the depth level exceeds the first level, and adjusts the pixel information of the stereoscopic image so that at least one of a detail level, a contrast level, a color level and a brightness level of the setup region can be increased, and at least one of the detail level, the contrast level, the color level and the brightness level of the surrounding region can be decreased, if the difference in the depth level exceeds the second level.

The picture quality adjusting unit may adjust the pixel information of the stereoscopic image so that at least one of the detail level, the contrast level, the color level and the brightness level of the setup region and the surrounding region can be increased if the difference in the depth level does not exceeds the second level.

The picture quality adjusting unit may determine increase and decrease ranges of at least one of the detail level, the contrast level, the color level and the brightness level in accordance with the depth level of the region to be adjusted.

The stereoscopic image may include a left-eye image and a right-eye image, and the picture quality adjusting unit may determine the increase and decrease ranges so that pixel values of the left-eye image and the right-eye image corresponding to the region to be adjusted can be similar to each other.

The picture quality adjusting unit may adjust the pixel information of the setup region in accordance with whether the depth level of the setup region exceeds a third level.

The picture quality adjusting unit may adjust the pixel information of the stereoscopic image so that at least one of a detail level, a contrast level, a color level and a brightness level of the setup and surrounding regions can be increased if the depth level of the setup region does not exceed the third level, and at least one of the detail level, the contrast level, the color level and the brightness level of the setup region can be more increased than that of the surrounding region.

The stereoscopic image may include a left-eye image and a right-eye image, and the picture quality adjusting unit may increase the increase ranges so that pixel values of the left-eye image and the right-eye image corresponding to the setup region can be similar to each other.

According to an aspect of another exemplary embodiment, there is provided a control method of an image processing apparatus, the method including: estimating a depth map of a stereoscopic image; setting up a region in the stereoscopic image; determining difference in a depth level between the setup region and a surrounding region other than the setup region on the basis of the estimated depth map; and adjusting a 3D effect of the stereoscopic image in accordance with the determined difference in the depth level.

The adjusting the 3D effect may include adjusting a depth of the stereoscopic image in accordance with whether the determined difference in the depth level exceeds a first level.

The adjusting the depth may include adjusting the depth of the stereoscopic image to increase the difference in the depth level if the determined difference in the depth level does not exceed the first level.

The adjusting the depth may include determining whether the difference in the depth exceeds a second level if the determined difference in the depth exceeds the first level; and adjusting the depth of the stereoscopic image to decrease the difference in the depth level if it is determined that the difference in the depth level exceeds the second level.

The adjusting the 3D effect may include adjusting the 3D effect of the stereoscopic image in accordance with whether the depth level of the setup region exceeds the third level.

The adjusting the 3D effect of the setup region may include adjusting the depth of the setup region to increase the depth level of the setup region if the depth level of the setup region does not exceed the third level.

According to an aspect of another exemplary embodiment, there is provided a control method of an image processing apparatus, the method including estimating a depth map of a stereoscopic image; setting up a region in the stereoscopic image; determining difference in a depth level between the setup region and a surrounding region other than the setup region on the basis of the estimated depth map; and adjusting picture quality by adjusting pixel information of the stereoscopic image in accordance with the determined difference in the depth level.

The adjusting the picture quality may include adjusting the pixel information of the stereoscopic image in accordance with whether the difference in the depth level exceeds a first level.

The adjusting the picture quality may include adjusting the pixel information of the stereoscopic image by adjusting at least one of detail, contrast, color and brightness of the stereoscopic image.

The adjusting the picture quality may include adjusting the pixel information of the stereoscopic image so that at least one of a detail level, a contrast level, a color level and a brightness level of the setup and surrounding regions can be increased if the determined difference in the depth level does not exceed the first level, and at least one of the detail level, the contrast level, the color level and the brightness level of the setup region can be more increased than that of the surrounding region.

The adjusting the picture quality may include determining whether the difference in the depth level exceeds a second level if the determined difference in the depth level exceeds the first level; and adjusting the pixel information of the stereoscopic image so that at least one of a detail level, a contrast level, a color level and a brightness level of the setup region can be increased, and at least one of the detail level, the contrast level, the color level and the brightness level of the surrounding region can be decreased, if the difference in the depth level exceeds the second level.

The adjusting the picture quality may include adjusting the pixel information of the stereoscopic image so that at least one of the detail level, the contrast level, the color level and the brightness level of the setup region and the surrounding region can be increased if the difference in the depth level does not exceeds the second level.

The adjusting the picture quality may include determining increase and decrease ranges of at least one of the detail level, the contrast level, the color level and the brightness level in accordance with the depth level of the region to be adjusted.

The stereoscopic image may include a left-eye image and a right-eye image, and the adjusting the picture quality may include determining the increase and decrease ranges so that pixel values of the left-eye image and the right-eye image corresponding to the region to be adjusted can be similar to each other.

The adjusting the picture quality may include adjusting the pixel information of the setup region in accordance with whether the depth level of the setup region exceeds a third level.

The adjusting the picture quality may include adjusting the pixel information of the stereoscopic image so that at least one of a detail level, a contrast level, a color level and a brightness level of the setup and surrounding regions can be increased if the depth level of the setup region does not exceed the third level, and at least one of the detail level, the contrast level, the color level and the brightness level of the setup region can be more increased than that of the surrounding region.

The stereoscopic image may include a left-eye image and a right-eye image, and the adjusting the picture quality may include increasing the increase ranges so that pixel values of the left-eye image and the right-eye image corresponding to the setup region can be similar to each other.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

Figure 1:
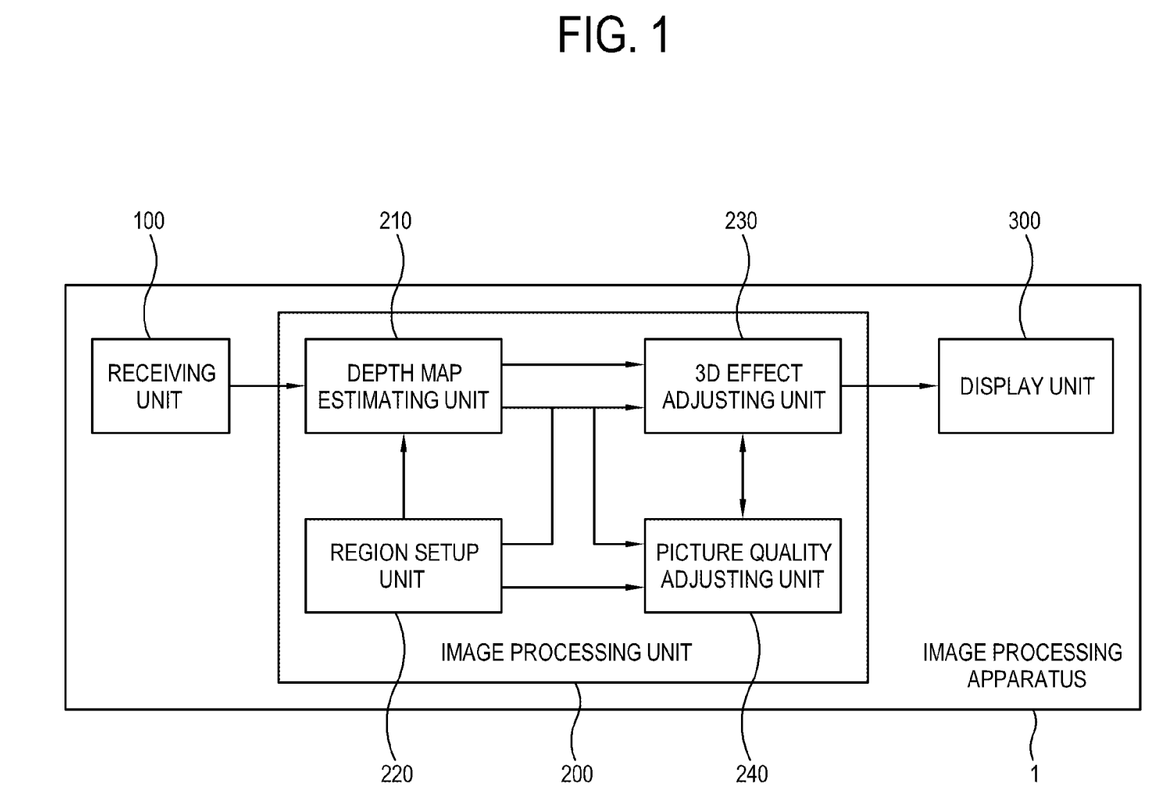
FIG. 1 is a block diagram of an image processing apparatus according to an exemplary embodiment.

FIG. 1 is a block diagram of an image processing apparatus according to an exemplary embodiment.

An image processing apparatus 1 in this exemplary embodiment may be achieved by a television, a monitor, etc. which includes a display unit 300 capable of displaying an image, but embodiments are not limited thereto. The image processing apparatus 1 may also be achieved by a set-top box (STB), a personal video recorder (PVR), a digital versatile disc and/or a Bluray disc (BD) player, etc. which transmits a video signal to an external television or monitor, and does not include the display unit 300. Further, the image processing apparatus 1 may be achieved by any device which can process a video signal received from an external source or video data stored therein to be displayed.

As shown in FIG. 1, the image processing apparatus 1 includes a receiving unit 100, an image processing unit 200, and the display unit 300. The image processing unit 200 includes a depth map estimating unit 210, a region setup unit 220, a 3D effect adjusting unit 230, and a picture quality adjusting unit 240. As used throughout this description, a "unit" may be embodied as hardware, such as a processor, and/or software executed by a hardware processor.

The receiving unit 100 receives a video signal from various external video sources (not shown) and transmits the received video signal to the depth map estimating unit 210. The receiving unit 100 may wirelessly receives a radio frequency (RF) signal from a broadcasting station, or may receive a video signal based on composite video, component video, super video, Syndicat des Constructeurs des Appareils Radiorécepteurs et Téléviseurs (SCART), High-Definition Multimedia Interface (HDMI) or the like standards through a wire. Also, the receiving unit 100 may access a web server (not shown) and receive a data packet of web contents. For example, the receiving unit 100 receives a stereoscopic video signal. The stereoscopic video signal includes a left-eye image corresponding to a viewer's left eye and a right-eye image corresponding to a viewer's right eye. When the receiving unit 100 receives a stereoscopic video signal, the display unit 300 alternately displays the left-eye image and the right-eye image based on the stereoscopic video signal by frames.

The image processing unit 200 includes the depth map estimating unit 210, the region setup unit 220, the 3D effect adjusting unit 230, and the picture quality adjusting unit 240.

The image processing unit 200 adjusts a 3D effect and picture quality of a stereoscopic image, and may also perform a general image process. For example, the image processing unit 200 may perform various processes such as decoding for various video formats, deinterlacing, frame rate conversion, scaling, noise reduction, etc.

The depth map estimating unit 210 estimates a depth map of a stereoscopic video signal received from the receiving unit 100. The stereoscopic video signal includes a left-eye video signal and a right-eye video signal, and the depth map estimating unit 210 estimates the depth map from the left-eye and right-eye video signals.

The region setup unit 220 may set up a predetermined region in a stereoscopic image received from the receiving unit 100. The region setup unit 220 may set up a predetermined region in the stereoscopic video signal based on the depth map estimated by the depth map estimating unit 210. For example, a region having a relatively high depth level in the estimated depth map may be set up as the predetermined region. Alternatively, the region setup unit 220 may extract pixel information from the received stereoscopic video signal and set up a region containing at least one object in the stereoscopic video signal as the predetermined region. The region setup unit 220 may set up a plurality of setup regions in the stereoscopic image.

Figure 2:
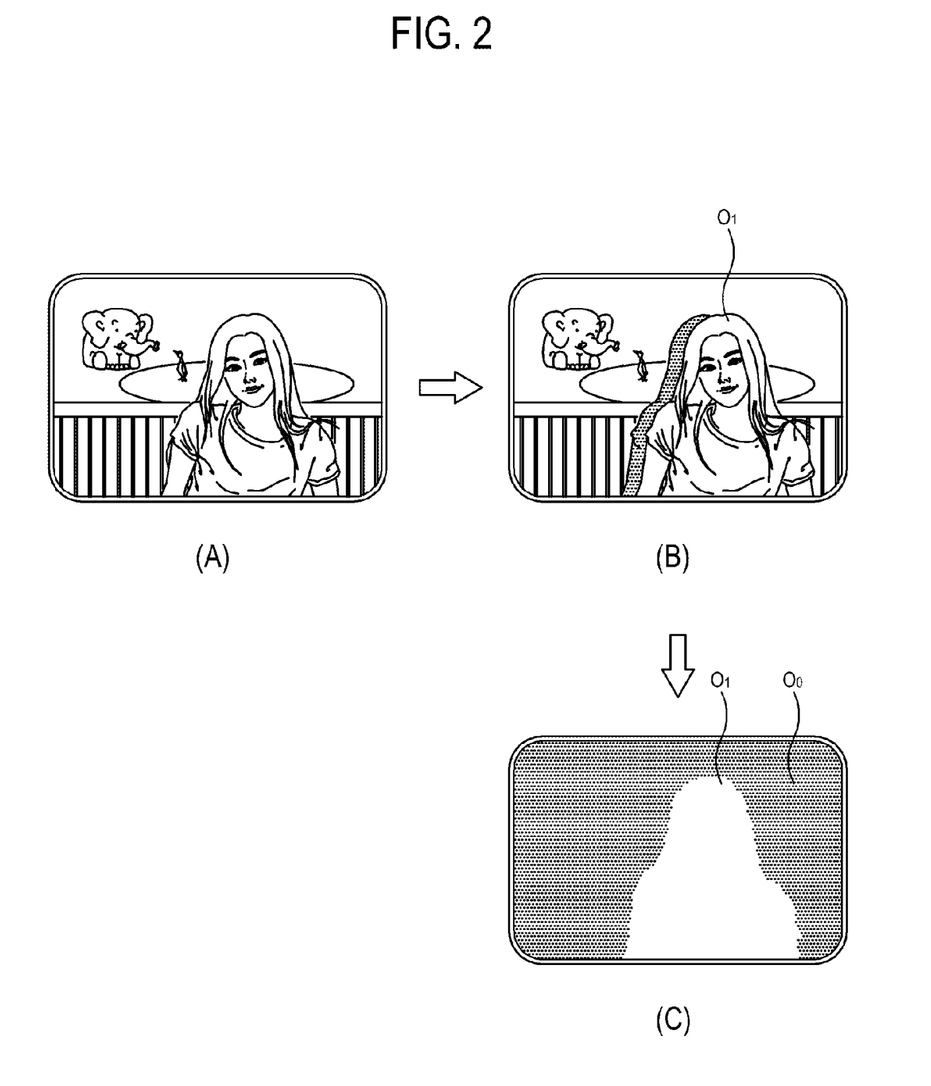
FIG. 2 shows an example of a region setup method of a region setup unit provided in the image processing apparatus of FIG. 1.

FIG. 2 shows an example of a region setup method of the region setup unit 220 provided in the image processing apparatus of FIG. 1. Referring to FIG. 2, a stereoscopic video signal (refer to (A) in FIG. 2) is received through the receiving unit 100, and pixel information is extracted from the received stereoscopic video signal. Then, a major object is selected using a depth map received from the depth map estimating unit 210, and set up as a predetermined region $O_1$ (refer to (B) in FIG. 2).

Also, the region setup unit 220 analyzes a depth level range in the predetermined region (hereinafter, referred to as a "setup region" $O_1$ of (C) in FIG. 2) and a depth level range of the other regions (hereinafter, referred to as a "surrounding region" $O_0$ of (C) in FIG. 2) except the setup region, based on the estimated depth map information, and transmits the depth level range to the 3D effect adjusting unit 230.

The 3D effect adjusting unit 230 adjusts a depth level of the stereoscopic image to adjust the 3D effect of the stereoscopic image received in the receiving unit 100.

The 3D effect adjusting unit 230 receives an estimated depth map from the depth map estimating unit 210, and receives information about the setup region and the surrounding region from the region setup unit 220. The information includes not only information about ranges (e.g., pixels) of the setup region and the surrounding region in the stereoscopic image, but also information about depth level ranges of the setup region and the surrounding region. Thus, the 3D effect adjusting unit 230 calculates difference in a depth level between the setup region and the surrounding region on the basis of the received information, and determines whether the calculated difference between the two depth levels exceeds a first level.

The 3D effect adjusting unit 230 adjusts the depth of the stereoscopic image based on whether the calculated difference exceeds the first level. If the calculated difference in the depth level between the setup region and the surrounding region does not exceed the first level, the 3D effect adjusting unit 230 adjusts the depth of the stereoscopic image to increase the difference in the depth level.

On the other hand, if the calculated difference in the depth level exceeds the first level, the 3D effect adjusting unit 230 determines whether the calculated difference in the depth level exceeds a second level. If it is determined that the difference in the depth level exceeds the second level, the 3D effect adjusting unit 230 adjusts the depth of the stereoscopic image to decrease the difference in the depth level.

Figure 3:
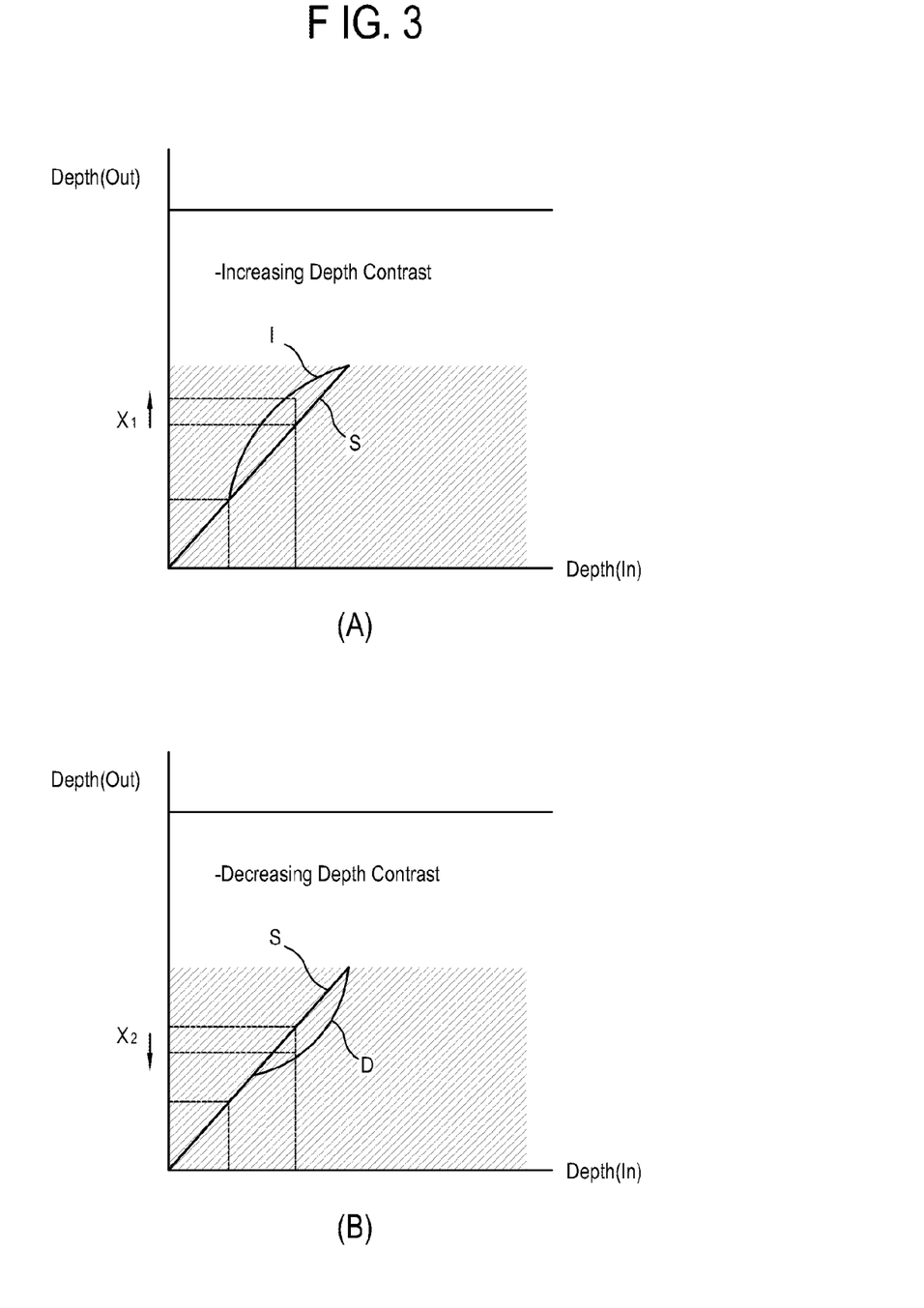
FIGS. 3A and 3B show examples of a depth adjusting method of a 3D effect adjusting unit provided in the image processing apparatus of FIG. 1.

FIGS. 3A and 3B show examples of a depth adjusting method of the 3D effect adjusting unit 230 provided in the image processing apparatus of FIG. 1.

If the calculated difference in the depth level does not exceed the first level, the 3D effect adjusting unit 230 carries out depth adjustment as shown in FIG. 3A. In FIG. 3A, the X axis indicates a depth level according to the depth map estimated by the depth map estimating unit 210, the Y axis indicates a depth level adjusted by a 3D effect adjusting unit 230, the S line indicates a function showing a proportional relationship of the adjusted depth level to the estimated depth level, and the I line indicates a function showing a range of increase adjustment for the depth level. The function for adjusting the depth level is determined in accordance with the distribution, magnitude and difference of the depth level from the estimated depth map of the stereoscopic image, which is a function to increase the calculated difference in the depth level by a predetermined range $X_1$. Thus, the 3D effect adjusting unit 230 carries out the depth adjustment of the stereoscopic image so that the difference between the two depth levels can be increased by a predetermined range $X_1$ if the calculated difference in the depth level between the setup region and the surrounding region does not exceed the first level. Accordingly, the setup region gives a feeling of more depth as compared with the surrounding region.

On the other hand, if the difference in the depth level between the setup region and the surrounding region exceeds the first level, the 3D effect adjusting unit 230 determines whether the difference in the depth level exceeds the second level. If it is determined that the difference in the depth level exceeds the second level, the 3D effect adjusting unit 230 carries out the depth adjustment as shown in FIG. 3B. The D line indicates a function showing a range of decrease adjustment for the depth level through the 3D effect adjusting unit 230, which is determined like the I line in accordance with the distribution, magnitude and difference of the depth level from the estimated depth map of the stereoscopic image, and is a function to decrease the calculated difference in the depth level by a predetermined range $X_2$. Thus, the 3D effect adjusting unit 230 carries out the depth adjustment of the stereoscopic image so that the difference between the two depth levels can be decreased by a predetermined range $X_2$ if the calculated difference in the depth level between the setup region and the surrounding region exceeds the second level.

On the other hand, if it is determined that the difference in the depth level does not exceed the second level, the 3D effect adjusting unit 230 does not carry out the depth adjustment of the stereoscopic image.

The 3D effect adjusting unit 230 adjusts the 3D effect of the setup region in accordance with whether the depth level of the setup region exceeds a third level. Here, the depth level of the setup region may be a predetermined range, and thus the third level may also be a value having a predetermined range. The 3D effect adjusting unit 230 determines whether the depth level of the setup region set up by the region setup unit 220 exceeds the third level. If it is determined that the depth level of the setup region does not exceed the third level, the 3D effect adjusting unit 230 adjusts the depth level of the setup region to be increased. When adjusting the depth level of the setup region to be increased, the 3D effect adjusting unit 230 may use the function I of increase adjustment for the depth level (refer to FIG. 3A). On the other hand, if it is determined that the depth level of the setup region exceeds the third level, the 3D effect adjusting unit 230 does not carry out the depth adjustment of the setup region.

The picture quality adjusting unit 240 adjusts the pixel information of the stereoscopic image in order to adjust the picture quality of the stereoscopic image received by the receiving unit 100.

The picture quality adjusting unit 240 receives the estimated depth map from the depth map estimating unit 210, and receives information about the setup region and the surrounding region from the region setup unit 220. The information includes information about ranges (e.g., pixels) of the setup region and the surrounding region in the stereoscopic image, as well as information about depth level ranges of the setup region and the surrounding region. Thus, the 3D effect adjusting unit 230 calculates difference in a depth level between the setup region and the surrounding region on the basis of the received information, and determines whether the calculated difference between the two depth levels exceeds a first level. Also, the picture quality adjusting unit 240 may receive a difference result in the depth level between the setup region and the surrounding region from the 3D effect adjusting unit 230.

The picture quality adjusting unit 240 adjusts the pixel information of the stereoscopic image in order to adjust the picture quality of the stereoscopic image in accordance with whether the calculated difference in the depth level between the setup region and the surrounding region exceeds the first level. The picture quality adjusting unit 240 adjusts the pixel information of the stereoscopic image by adjusting at least one of a detail level, a contrast level, a color level and a brightness level of the stereoscopic image.

If the difference in the depth level does not exceeds the first level, the picture quality adjusting unit 240 adjusts the pixel information of the stereoscopic image so that at least one of the detail level, the contrast level, the color level and the brightness level of the setup and surrounding regions (i.e., all regions) can be increased, in which the pixel information of the stereoscopic image is adjusted so that at least one of the detail level, the contrast level, the color level and the brightness level of the setup region can be increased more than that of the surrounding region.

On the other hand, if the difference in the depth level exceeds the first level, the picture quality adjusting unit 240 determines whether the difference in the depth level exceeds the second level. If it is determined that the difference in the depth level exceeds the second level, the picture quality adjusting unit 240 adjusts the pixel information of the stereoscopic image so that at least one of the detail level, the contrast level, the color level and the brightness level of the setup region can be increased, and at least one of the detail level, the contrast level, the color level and the brightness level of the surrounding region can be decreased.

On the other hand, if it is determined that the difference in the depth level does not exceed the second level, the picture quality adjusting unit 240 adjusts the pixel information of the stereoscopic image so that at least one of the detail level, the contrast level, the color level and the brightness level of the setup region and the surrounding region (i.e., all regions) can be increased.

The picture quality adjusting unit 240 may determine increase and decrease ranges of at least one of the detail level, the contrast level, the color level and the brightness level in accordance with the depth level of the region to be adjusted.

When the picture quality adjusting unit 240 increases at least one of the detail level, the contrast level, the color level and the brightness level of the setup region, an increase range may be determined in proportion to the depth level of the setup region (e.g., the depth level of the depth map estimated by the depth map estimating unit 210 or the depth level adjusted by the 3D effect adjusting unit 230). For example, the increase range of the detail level in the setup region is determined by expression 1 as follows:

$$\alpha_1(i, j), \beta_1(i, j) \propto \frac{1}{(D_{max} - D_{object})} \quad \text{[Equation 1]}$$

where $\alpha_1(i,j)$ indicates a detail level of a setup region in a left-eye image, $\beta_1(i,j)$ indicates a detail level of a setup region in a right-eye image, $D_{max}$ indicates a depth level of the foremost view of a stereoscopic image, and $D_{object}$ indicates a depth level of the setup region.

For example, the increase range of the contrast level in the setup region is determined by expression 2 as follows:

$$\alpha_2(i, j), \beta_2(i, j) \propto \frac{1}{(D_{max} - D_{object})} \quad \text{[Equation 2]}$$

where $\alpha_2(i,j)$ indicates a contrast level of a setup region in a left-eye image, $\beta_2(i,j)$ indicates a contrast level of a setup region in a right-eye image, $D_{max}$ indicates a depth level of the foremost view of a stereoscopic image, and $D_{object}$ indicates a depth level of the setup region.

Like expressions 1 and 2, in order to improve the picture quality, the picture quality adjusting unit 240 may determine the increase ranges of the color and brightness levels in proportion to the depth levels of the setup region.

Also, this is similarly applied to even the case where at least one of the detail level, the contrast level, the color level and the brightness level of an adjustment region is decreased. Thus, the picture quality adjusting unit 240 may determine a decrease range to be decreased in proportion to the depth level of the adjustment region. Thus, this region may not be more blurred than a farther part.

Further, the picture quality adjusting unit 240 may adjust pixel values of the left-eye and right-eye images to be similar to each other when adjusting the detail level, the contrast level, the color level or the brightness level to be increased or decreased. If the picture quality adjusting unit 240 does not control a correlation between the left-eye and right-eye images while adjusting the picture quality, a mismatch may arise. To prevent such a mismatch, the picture quality adjusting unit 240 takes the following expression 3 into account when increasing or decreasing the detail level, so that the pixel values of the left-eye and right-eye images can be similar to each other.

$$\alpha_1(i,j)*L(i,j) \approx \beta_1(i,j)*R(i+\Delta i, j+\Delta j) \quad \text{[Expression 3]}$$

where $\alpha_1(i,j)$ indicates a detail level of a setup region in a left-eye image, $L(i,j)$ indicates a pixel of the left-eye image, $\beta_1(i,j)$ indicates a detail level of a setup region in a right-eye image, and $R(i+\Delta i, j+\Delta j)$ indicates a pixel of the right-eye image.

Also, to prevent such a mismatch, the picture quality adjusting unit 240 takes the following expression 4 into account when increasing or decreasing the contrast level, so that the pixel values of the left-eye and right-eye images can be similar to each other.

$$\alpha_2(i,j)*L(i,j) \approx \beta_2(i,j)*R(i+\Delta i, j+\Delta j) \quad \text{[Expression 4]}$$

where $\alpha_2(i,j)$ indicates a contrast level of a setup region in a left-eye image, $L(i,j)$ indicates a pixel of the left-eye image, $\beta_2(i,j)$ indicates a contrast level of a setup region in a right-eye image, and $R(i+\Delta i, j+\Delta j)$ indicates a pixel of the right-eye image.

Like expressions 3 and 4, in order to improve the picture quality, the picture quality adjusting unit 240 may determine the increase and decrease ranges of the color and brightness levels so that the pixel values of the left-eye and right-eye images can be similar to each other.

The image processing unit 200 multiplexes a signal, of which the adjustments for the depth and the picture quality are respectively completed by the 3D effect adjusting unit 230 and the picture quality adjusting unit 240, and transmits it to the display unit 300.

The display unit 300 displays an image based on the video signal output from the image processing unit 200. Thus, the display unit 300 displays an image corresponding to a stereoscopic video signal improved in the 3D effect and the picture quality, output from the image processing unit 200. The display unit 300 may be achieved by various display methods using liquid crystal, plasma, a light emitting diode, an organic light emitting diode, a surface conduction electron emitter, a carbon nano tube, nano crystal, etc., but not limited thereto.

Figure 4A:
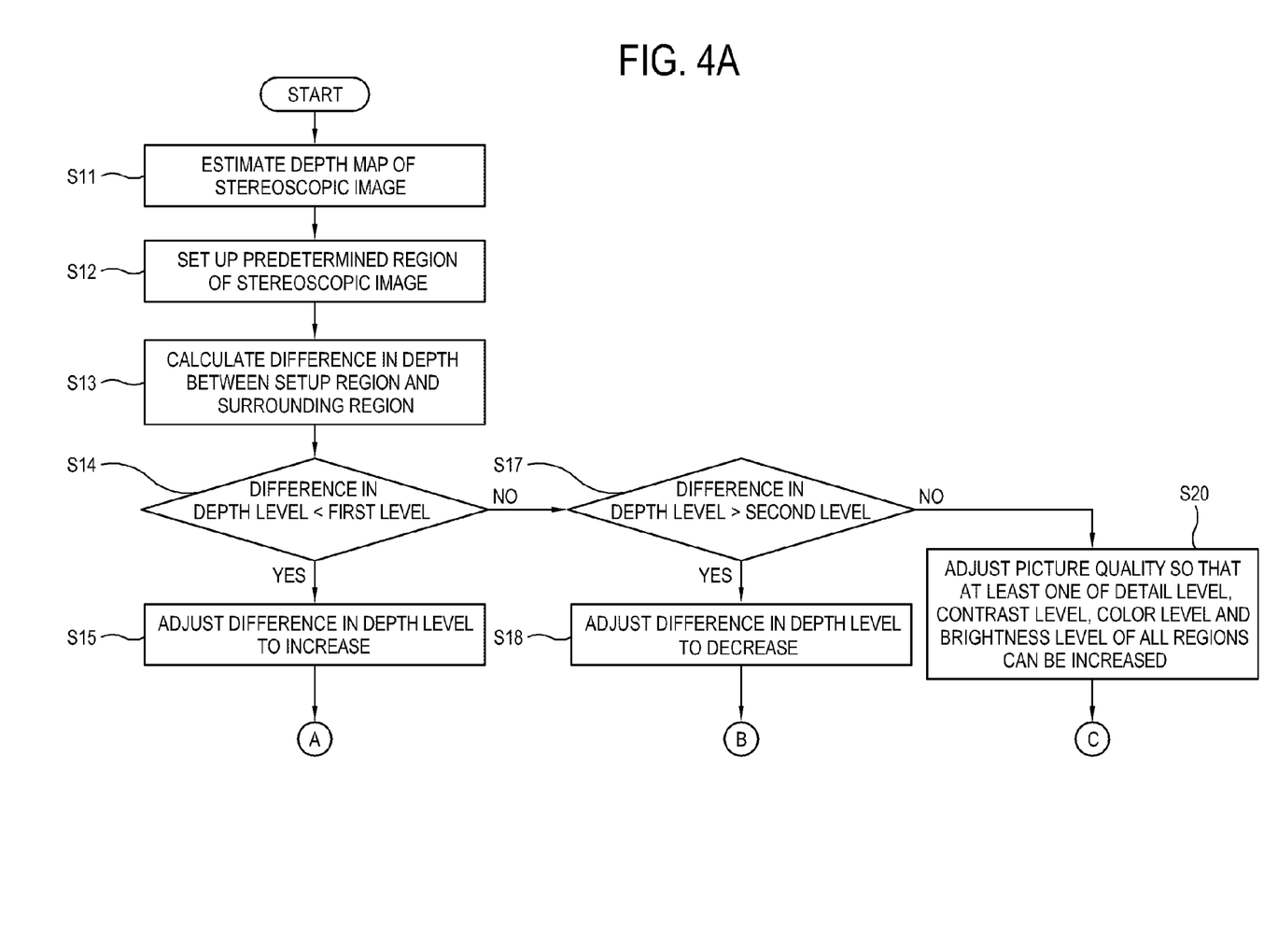
FIGS. 4A and 4B are a flowchart showing a processing operation of an image processing unit of the image processing apparatus of FIG. 1 according to an exemplary embodiment.
Figure 4B:
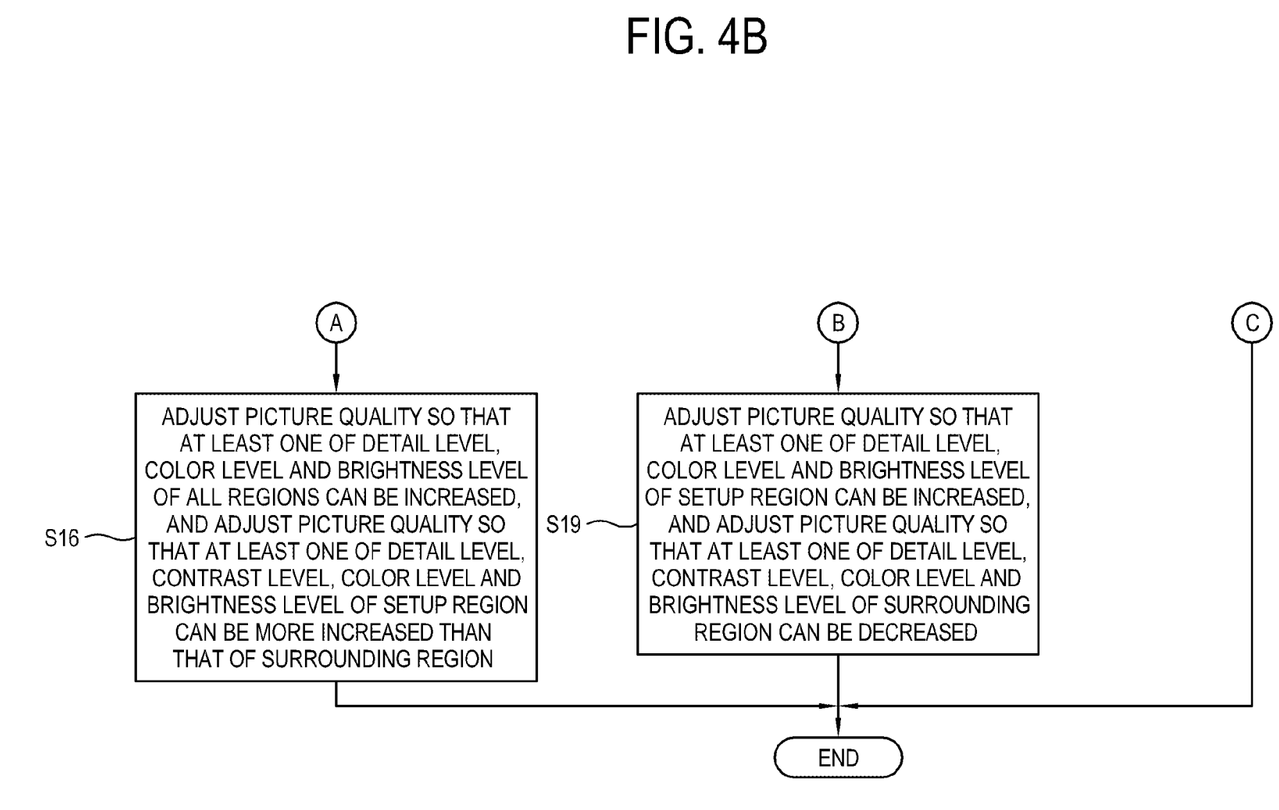

FIGS. 4A and 4B are a flowchart showing a processing operation of an image processing unit of the image processing apparatus of FIG. 1 according to an exemplary embodiment.

As shown in FIGS. 4A and 4B, if a stereoscopic video signal is received through the receiving unit 100, the received stereoscopic video signal is transmitted to the depth map estimating unit 210, and the depth map adjusting unit 210 estimates the depth map of the stereoscopic video signal (operation S11). Also, the stereoscopic video signal is transmitted to the region setup unit 220, and the region setup unit 220 sets up a predetermined region in the stereoscopic image on the basis of the estimated depth map at operation S12.

The 3D effect adjusting unit 230 calculates difference in the depth level between the setup region and the surrounding region (operation S13), and determines whether the difference in the depth level exceeds the first level (operation S14). If the difference in the depth level does not exceed the first level, the difference in the depth level is adjusted to be increased (operation S15). The picture quality adjusting unit 240 adjusts the picture quality so that at least one of the detail level, the contrast level, the color level and the brightness level of the setup and surrounding regions (i.e., all regions) can be increased, in which the pixel information of the stereoscopic image is adjusted so that at least one of the detail level, the contrast level, the color level and the brightness level of the setup region can be more increased than that of the surrounding region (operation S16). Operations S15 and S16 may be carried out in reverse order or may be carried out at the same time.

On the other hand, if the difference in the depth level exceeds the first level, the 3D effect adjusting unit 230 determines whether the difference in the depth level exceeds the second level (operation S17). If the difference in the depth level exceeds the second level, the difference in the depth level is adjusted to be decreased (operation S18). The picture quality adjusting unit 240 adjusts the picture quality so that at least one of the detail level, the contrast level, the color level and the brightness level of the setup region can be increased, and at least one of the detail level, the contrast level, the color level and the brightness level of the surrounding region can be decreased (operation S19). Operations S17 and S18 may be carried out in reverse order or may be carried out at the same time. Also, if the difference in the depth level does not exceed the second level at operation S17, the 3D effect adjusting unit 230 does not adjust the difference in the depth level, and the picture quality adjusting unit 240 adjusts the picture quality so that at least one of the detail level, the contrast level, the color level and the brightness level of the setup and surrounding regions (i.e., all regions) can be increased (operation S20).

Figure 5:
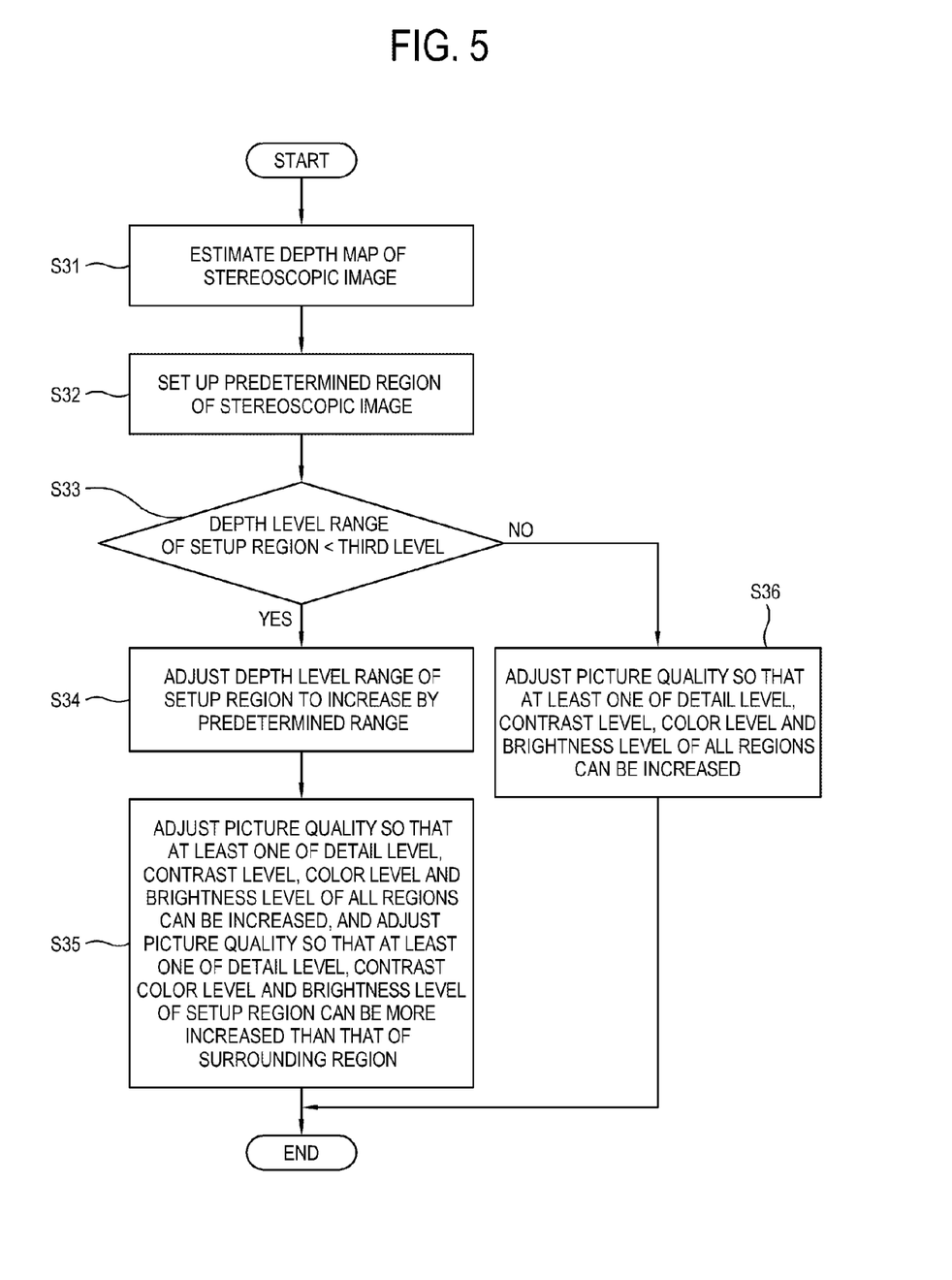
FIG. 5 is a flowchart showing a processing operation of an image processing unit of the image processing apparatus of FIG. 1 according to another exemplary embodiment.

FIG. 5 is a flowchart showing another exemplary embodiment of a processing operation of an image processing unit of the image processing apparatus of FIG. 1.

If a stereoscopic video signal is received through the receiving unit 100, the received stereoscopic video signal is transmitted to the depth map estimating unit 210, and the depth map adjusting unit 210 estimates the depth map of the stereoscopic video signal (operation S31). Also, the stereoscopic video signal is transmitted to the region setup unit 220, and the region setup unit 220 sets up a predetermined region in the stereoscopic image on the basis of the estimated depth map (operation S32).

The 3D effect adjusting unit 230 determines whether the depth level of the setup region exceeds the third level (operation S33). If it determined that the depth level does not exceed the third level, the 3D effect adjusting unit 230 adjusts the difference in the depth level to be increased by a predetermined range (operation S34) and the picture quality adjusting unit 240 adjusts the picture quality so that at least one of the detail level, the contrast level, the color level and the brightness level of the setup and surrounding regions (i.e., all regions) can be increased, in which the picture quality is adjusted so that at least one of the detail level, the contrast level, the color level and the brightness level of the setup region can be more increased than that of the surrounding region. If it is determined that the depth level exceeds the third level, the 3D effect adjusting unit 230 does not adjust the difference in the depth level, and the picture quality adjusting unit 240 adjusts the picture quality so that at least one of the detail level, the contrast level, the color level and the brightness level of the setup and surrounding regions (i.e., all regions) can be increased (operation S36).

The operations of the image processing unit 200 as shown in FIGS. 4A, 4B and 5 may be carried at the same time.

As described above, there are provided an image processing apparatus capable of improving not only depth but also picture quality of a stereoscopic image in order to enhance a 3D effect of the stereoscopic image, and a control method thereof.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. An image processing apparatus comprising at least one processor or integrated circuit configured to function as:
    a depth map estimating unit which estimates a depth map of a stereoscopic image;
    a region setup unit which sets up a setup region and a surrounding region in the stereoscopic image; and
    a 3D effect adjusting unit which calculates, based on the estimated depth map, a difference in a depth level between the setup region and the surrounding region, and adjusts a depth of the stereoscopic image based on the determined difference in the depth level, wherein the surrounding region is a remainder of the stereoscopic image excluding the setup region.

2. The image processing apparatus according to claim 1, wherein the 3D effect adjusting unit adjusts the depth of the stereoscopic image based on whether the determined difference in the depth level exceeds a first threshold level.

3. The image processing apparatus according to claim 2, wherein the 3D effect adjusting unit adjusts the depth of the stereoscopic image to increase the difference in the depth level if the determined difference in the depth level does not exceed the first threshold level.

4. The image processing apparatus according to claim 2, wherein if the calculated difference in the depth exceeds the first level, the 3D effect adjusting unit determines whether the difference in the depth exceeds a second level, and adjusts the depth of the stereoscopic image to decrease the difference in the depth level if the difference in the depth level exceeds the second level.

5. The image processing apparatus according to claim 1, wherein the 3D effect adjusting unit adjusts the depth of the stereoscopic image based on whether a depth level of the setup region exceeds a third level.

6. The image processing apparatus according to claim 5, wherein the 3D effect adjusting unit adjusts a depth of the setup region to increase a depth level of the setup region if the depth level of the setup region does not exceed the third level.

7. An image processing apparatus comprising at least one processor or integrated circuit configured to function as:
    a depth map estimating unit which estimates a depth map of a stereoscopic image;
    a region setup unit which sets up a setup region and a surrounding region in the stereoscopic image; and
    a picture quality adjusting unit which calculates, based on the estimated depth map, a difference in a depth level between the setup region and the surrounding region, and adjusts pixel information of the stereoscopic image based on the determined difference in the depth level, wherein the surrounding region is a remainder of the stereoscopic image excluding the setup region.

8. The image processing apparatus according to claim 7, wherein the picture quality adjusting unit adjusts the pixel information of the stereoscopic image based on whether the difference in the depth level exceeds a first level.

9. The image processing apparatus according to claim 8, wherein the picture quality adjusting unit adjusts the pixel information of the stereoscopic image by adjusting at least one of a detail, a contrast, a color and a brightness of the stereoscopic image.

10. The image processing apparatus according to claim 9, wherein the picture quality adjusting unit adjusts the pixel information of the stereoscopic image so that at least one of a detail level, a contrast level, a color level and a brightness level of the setup and surrounding regions can be increased if the determined difference in the depth level does not exceed the first level, and at least one of the detail level, the contrast level, the color level and the brightness level of the setup region can be more increased than that of the surrounding region.

11. The image processing apparatus according to claim 9, wherein the picture quality adjusting unit determines whether the difference in the depth level exceeds a second level if the determined difference in the depth level exceeds the first level, and adjusts the pixel information of the stereoscopic image so that at least one of a detail level, a contrast level, a color level and a brightness level of the setup region can be increased, and at least one of the detail level, the contrast level, the color level and the brightness level of the surrounding region can be decreased, if the difference in the depth level exceeds the second level.

12. The image processing apparatus according to claim 11, wherein the picture quality adjusting unit adjusts the pixel information of the stereoscopic image so that at least one of the detail level, the contrast level, the color level and the brightness level of the setup region and the surrounding region can be increased if the difference in the depth level does not exceed the second level.

13. The image processing apparatus according to claim 9, wherein the picture quality adjusting unit determines increase and decrease ranges of at least one of the detail level, the contrast level, the color level and the brightness level based on the depth level of the region to be adjusted.

14. The image processing apparatus according to claim 13, wherein the stereoscopic image comprises a left-eye image and a right-eye image, and
    the picture quality adjusting unit determines the increase and decrease ranges so that pixel values of the left-eye image and the right-eye image corresponding to the region to be adjusted can be similar to each other.

15. The image processing apparatus according to claim 7, wherein the picture quality adjusting unit adjusts the pixel information of the setup region based on whether the depth level of the setup region exceeds a third level.

16. The image processing apparatus according to claim 15, wherein the picture quality adjusting unit adjusts the pixel information of the stereoscopic image so that at least one of a detail level, a contrast level, a color level and a brightness level of the setup and surrounding regions can be increased if the depth level of the setup region does not exceed the third level, and at least one of the detail level, the contrast level, the color level and the brightness level of the setup region can be more increased than that of the surrounding region.

17. The image processing apparatus according to claim 16, wherein the stereoscopic image comprises a left-eye image and a right-eye image, and
the picture quality adjusting unit increases the increase ranges so that pixel values of the left-eye image and the right-eye image corresponding to the setup region can be similar to each other.

18. A control method of an image processing apparatus, the method comprising:
estimating a depth map of a stereoscopic image;
setting up a setup region and a surrounding region in the stereoscopic image;
calculating, based on the estimated depth map, a difference in a depth level between the setup region and the surrounding region, wherein the surrounding region is a remainder of the stereoscopic image excluding the setup region; and
adjusting a depth of the stereoscopic image based on the determined difference in the depth level.

19. The method according to claim 18, wherein the adjusting the depth comprises adjusting the depth of the stereoscopic image based on whether the determined difference in the depth level exceeds a first level.

20. The method according to claim 19, wherein the adjusting the depth comprises adjusting the depth of the stereoscopic image to increase the difference in the depth level if the determined difference in the depth level does not exceed the first level.

21. The method according to claim 19, wherein the adjusting the depth comprises:
determining whether the difference in the depth level exceeds a second level if the determined difference in the depth exceeds the first level; and
adjusting the depth of the stereoscopic image to decrease the difference in the depth level if it is determined that the difference in the depth level exceeds the second level.

22. The method according to claim 18, wherein the adjusting the depth comprises adjusting the depth of the stereoscopic image based on whether a depth level of the setup region exceeds a third level.

23. The method according to claim 22, wherein the adjusting the depth of the setup region comprises adjusting a depth of the setup region to increase the depth level of the setup region if the depth level of the setup region does not exceed the third level.

24. A control method of an image processing apparatus, the method comprising
estimating a depth map of a stereoscopic image;
setting up a setup region and a surrounding region in the stereoscopic image;
calculating, based on the estimated depth map, a difference in a depth level between the setup region and the surrounding region, wherein the surrounding region is a remainder of the stereoscopic image excluding the setup region; and
adjusting picture quality by adjusting pixel information of the stereoscopic image based on the determined difference in the depth level.

25. The method according to claim 24, wherein the adjusting the picture quality comprises adjusting the pixel information of the stereoscopic image based on whether the difference in the depth level exceeds a first level.

26. The method according to claim 25, wherein the adjusting the picture quality comprises adjusting the pixel information of the stereoscopic image by adjusting at least one of a detail, a contrast, a color and a brightness of the stereoscopic image.

27. The method according to claim 26, wherein the adjusting the picture quality comprises adjusting the pixel information of the stereoscopic image so that at least one of a detail level, a contrast level, a color level and a brightness level of the setup and surrounding regions can be increased if the determined difference in the depth level does not exceed the first level, and at least one of the detail level, the contrast level, the color level and the brightness level of the setup region can be more increased than that of the surrounding region.

28. The method according to claim 26, wherein the adjusting the picture quality comprises:
determining whether the difference in the depth level exceeds a second level if the determined difference in the depth level exceeds the first level; and
adjusting the pixel information of the stereoscopic image so that at least one of a detail level, a contrast level, a color level and a brightness level of the setup region can be increased, and at least one of the detail level, the contrast level, the color level and the brightness level of the surrounding region can be decreased, if the difference in the depth level exceeds the second level.

29. The method according to claim 28, wherein the adjusting the picture quality comprises adjusting the pixel information of the stereoscopic image so that at least one of the detail level, the contrast level, the color level and the brightness level of the setup region and the surrounding region can be increased if the difference in the depth level does not exceed the second level.

30. The method according to claim 26, wherein the adjusting the picture quality comprises determining increase and decrease ranges of at least one of the detail level, the contrast level, the color level and the brightness level based on the depth level of the region to be adjusted.

31. The method according to claim 30, wherein the stereoscopic image comprises a left-eye image and a right-eye image, and
the adjusting the picture quality comprises determining the increase and decrease ranges so that pixel values of the left-eye image and the right-eye image corresponding to the region to be adjusted can be similar to each other.

32. The method according to claim 24, wherein the adjusting the picture quality comprises adjusting the pixel information of the setup region based on whether the depth level of the setup region exceeds a third level.

33. The method according to claim 32, wherein the adjusting the picture quality comprises adjusting the pixel information of the stereoscopic image so that at least one of a detail level, a contrast level, a color level and a brightness level of the setup and surrounding regions can be increased if the depth level of the setup region does not exceed the third level, and at least one of the detail level, the contrast level, the color level and the brightness level of the setup region can be more increased than that of the surrounding region.

34. The method according to claim 33, wherein the stereoscopic image comprises a left-eye image and a right-eye image, and
the adjusting the picture quality comprises increasing the increase ranges so that pixel values of the left-eye image and the right-eye image corresponding to the setup region can be similar to each other.

* * * * *